United States Patent [19]

Hamilton

[11] 4,256,324
[45] Mar. 17, 1981

[54] RETRACTABLE TRUCK BED MOUNTED TRAILER HITCH

[75] Inventor: Carl L. Hamilton, Coffeyville, Kans.

[73] Assignee: HEC, Incorporated, Kans.

[21] Appl. No.: 54,464

[22] Filed: Jul. 3, 1979

[51] Int. Cl.³ .......................... B62D 53/08; B60D 1/06
[52] U.S. Cl. ................................. 280/433; 280/491 B; 280/511
[58] Field of Search .................... 280/433, 415 A, 511, 280/491 B

[56] References Cited

U.S. PATENT DOCUMENTS

| 2,494,799 | 1/1950 | Duvall et al. | 280/433 |
| 3,254,904 | 6/1966 | Jewell | 280/433 |
| 3,336,051 | 8/1967 | Dale | 280/490 R |
| 3,574,363 | 4/1971 | Stephenson | 280/433 |
| 3,791,674 | 2/1974 | Berends | 280/433 |
| 3,893,713 | 7/1975 | Ivy | 280/511 |

Primary Examiner—Randolph A. Reese
Assistant Examiner—Donn McGiehan
Attorney, Agent, or Firm—Harvey B. Jacobson

[57] ABSTRACT

A mount is recessed mounted in the load bed of a pick-up truck and defines an upwardly opening recess. A hitch member is pivotally mounted in the recess for oscillation between an operative position projecting upwardly from the recess and an inoperative position with a portion of the hitch member substantially flush with the upper end of the recess. Also, latch means is operatively associated with the hitch member and the mount for releasably retaining the hitch member in the operative position thereof.

9 Claims, 8 Drawing Figures

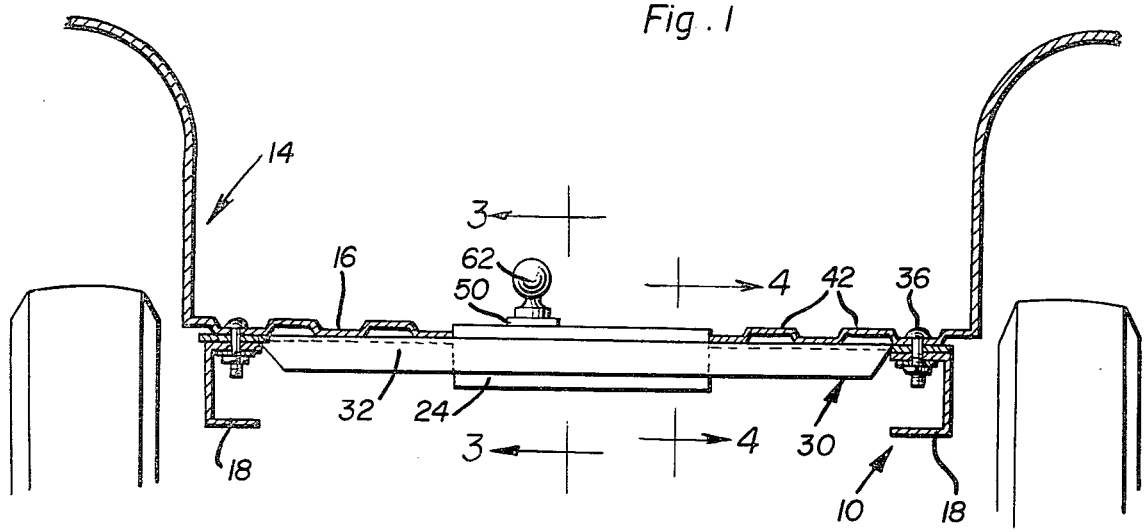
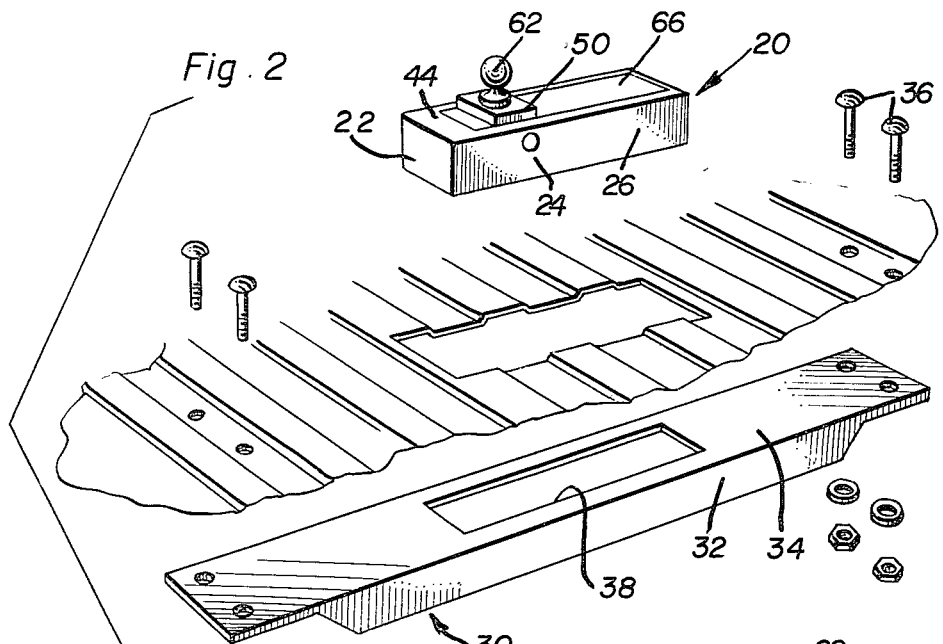
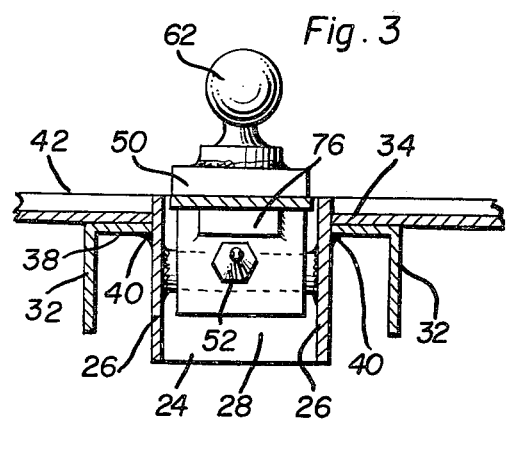
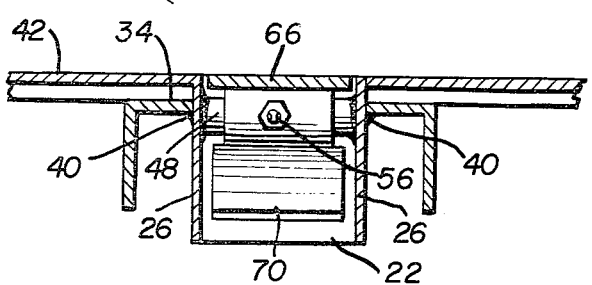

RETRACTABLE TRUCK BED MOUNTED TRAILER HITCH

BACKGROUND OF THE INVENTION

Various forms of truck bed mounted trailer hitches and coupling structures have been heretofore provided, such as those disclosed in U.S. Pat. Nos. 2,494,799, 3,254,904, 3,336,051, 3,574,363 and 3,791,674. However, these previously known forms of load bed mounted hitches are not constructed in a manner whereby the hitches may be fully retracted relative to the load bed with the load bed floor or load supporting surface substantially unbroken when the hitch is in the retracted position. Accordingly, a need exists for a retractable hitch for a load bed which may be utilized to tow various forms of equipment when in an operative position, yet which may be fully retracted relative to the load bed in a manner providing a substantially unbroken load bed surface when the hitch member is in the retracted inoperative position. Also, previously known forms of truck bed mounted trailer hitches have been constructed in a manner whereby considerable bracing structure must be provided for support of the hitches and the bracing structure requires considerable effort to install. Therefore, a further need exists for a retractable truck bed mounted trailer hitch which is adequately braced and may be readily mounted relative to existing pick-up truck load beds.

BRIEF DESCRIPTION OF THE INVENTION

The hitch of the instant invention may be readily mounted relative to an associated pick-up truck load bed merely by cutting one opening through the load bed of the pick-up truck and by the installation of a single transverse brace between the load bed and the underlying frame rails of the pick-up truck load bed.

The hitch is constructed in a manner whereby it may be readily shifted from a retracted position to an operative position and yet which is contained substantially flush with the associated pick-up truck load bed floor when the hitch is in an inoperative retracted position. Also, the hitch includes partial cover structure thereof which coacts, with the retractable hitch member, to form a substantial full closure for the opening in the mouth of the trailer hitch through which the hitch member may be shifted to the operative position.

The main object of this invention is to provide a truck bed mounted trailer hitch which may be readily mounted on existing pick-up truck load beds.

Yet another object of this invention is to provide a hitch in accordance with the preceding object and including adequate bracing structure also readily mountable on the associated pick-up truck.

A still further object of this invention is to provide a trailer hitch of the retractable type which, when retracted, coacts with the adjacent floor portions of the associated mode bed to define a substantially unbroken load supporting surface.

Another very important object of this invention is to provide a recessed trailer hitch for the load bed of a pick-up truck and which is shiftable to an extended position and may be readily automatically braced in the extended position as the hitch member is shifted from the retracted position to the operative position.

A final object of this invention to be specifically enumerated herein is to provide a retractable truck bed mounted trailer hitch in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a transverse vertical sectional view of a conventional form of pick-up truck load bed and adjacent truck frame portions and with the trailer hitch of the instant invention mounted in operative position relative to the load bed and track frame portions;

FIG. 2 is an exploded perspective view of the trailer hitch and the adjacent portions of the load bed;

FIG. 3 is an enlarged fragmentary transverse vertical sectional view taken substantially upon the plane indicated by the section line 3—3 of FIG. 1 and with the hitch member illustrated in a raised operative position;

FIG. 4 is an enlarged fragmentary transverse vertical sectional view taken substantially upon the plane indicated by the section line 4—4 of FIG. 1;

DETAILED DESCRIPTION OF THE INVENTION

Figure 5:
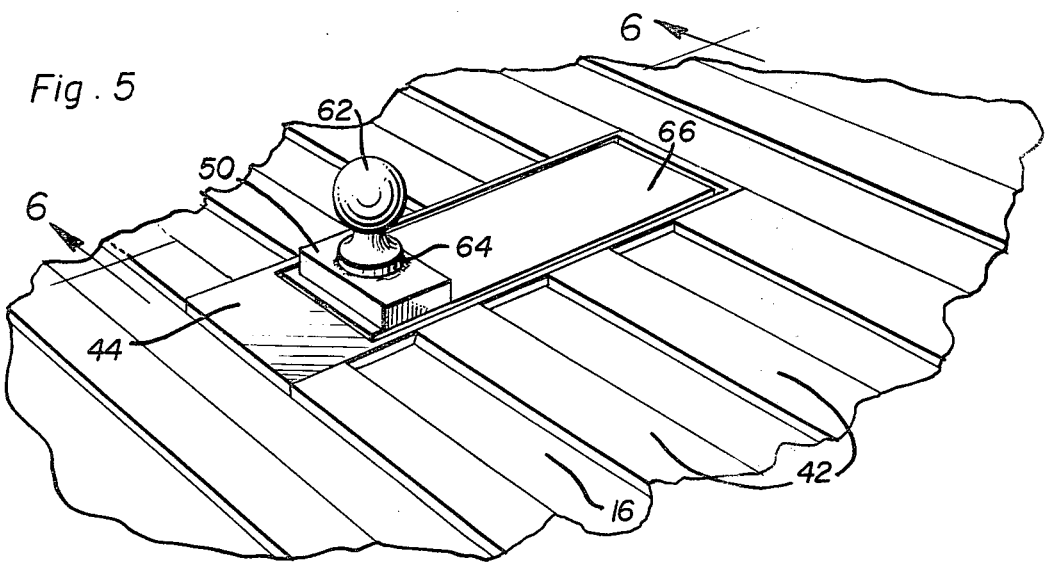
FIG. 5 is a fragmentary perspective view of the floor area of the pick-up truck load bed from which the trailer hitch is mounted and with the hitch member in an operative position.

Referring now more specifically to the drawings, the numeral 10 generally designates a conventional form of pick-up truck including a load bed referred to in general by the reference numeral 14 having a bottom or floor 16. The load bed 14 is conventionally mounted from the opposite side longitudinal frame rails 18 of the pick-up truck 10 and in many instances, the load bed 14 is spaced above the frame rails 18 by suitable spacing members (not shown).

The hitch assembly of the instant invention is referred to in general by the reference 20 and includes a mount or housing 22 defining an upstanding rectangular sleeve 24 including opposite longitudinal side walls 26 interconnected by oppsite end walls 28. An inverted channel-shaped brace member referred to in generally by the reference 30 is also provided and the brace member 30 includes depending opposite side longitudinal flanges 32 interconnected along their upper marginal edge portions by a web 34 extending and secured therebetween. The opposite ends of the web 34 project endwise outwardly beyond the corresponding ends of the flanges 32 and are secured, by means of fasteners 36, between opposite side portions of the floor 16 and the upper surfaces of the corresponding frame rails 18. When securing the opposite ends of the brace member 30 in position, it may be necessary to loosen the remaining load bed mounting bolts and to slightly pry or otherwise raise up the portions of the floor 16 beneath which the opposite ends of the web 34 are to be secured. However, in most intances, the opposite ends of the web 34 will be received in the spacing already existing between the flooring 16 and the upper surfaces of the frame rails 18 due to the spacers conventionally utilized to mount the load bed 14 from the frame rails 18.

The center portion of the web 34 is provided with an elongated opening 38 formed therein and the sleeve 24 has its upper end secured in the opening 38 by welding 40 with the upper end of the sleeve 24 projecting above the web 34 so as to be flush with the upper surfaces of the elevated portions 42 of the corrugated floor 16.

From FIGS. 5 through 8 of the drawings, it may be seen that one end of the upper portion of the sleeve 24 is partially closed by a stationary top wall portion 44 secured thereacross and a pair of transverse shafts 46 and 48 have their opposite ends secured through the side walls 26 by welding. A support block 50 is oscillatably mounted on the shaft 46 and is provided with a Zerk fitting 52 and a sleeve 54 is oscillatably mounted on the shaft 48 and provided with a Zerk fitting 56. The block 50 includes a blind bore 58 in which the shank 60 of a ball hitch member 62 is secured. If it is desired, the bore 58 may be threaded and the shank 60 may be threaded whereby the ball hitch member may be removably threadedly engaged in the bore 58. Otherwise, the ball hitch member may be secured in position relative to the block 50 by welding 64.

The sleeve 54 has a cover plate 66 supported therefrom as by welding 68 and also a keeper plate 70 supported therefrom as by welding 72. An abutment 76 is carried by one side of the block 50 for a purpose to be hereinafter more fully set forth and a pair of stop plates 78 are welded to the inner surfaces of the side walls 26.

The block 50 is chamfered as at 80 and includes a first side 82 which functions in one instance as an abutment surface and in another instance as a continuation of the floor 16 for partially bridging the open portion of the upper end of the sleeve 24.

Figure 6:
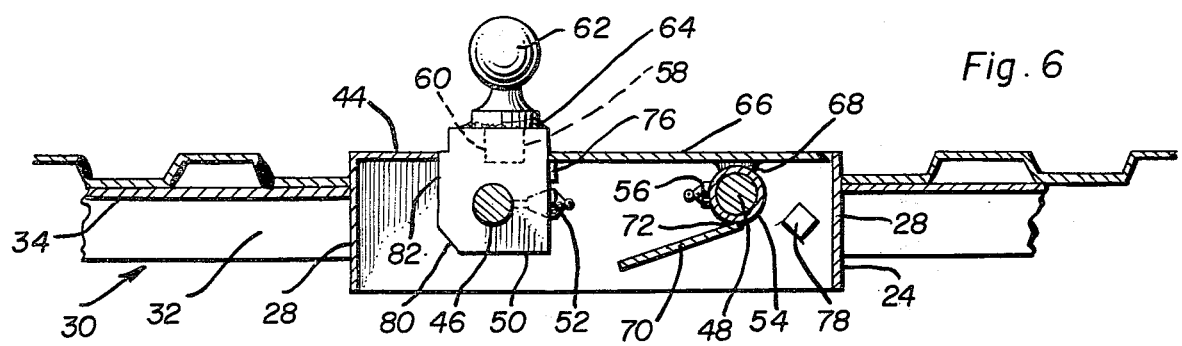
FIG. 6 is a fragmentary vertical sectional view taken substantially upon the plane indicated by the section line 6—6 of FIG. 5.

With attention now invited more specifically to FIG. 6 of the drawings, it may be seen that the ball hitch member, which may be considered to include the support block 50, is in an operative position with the surface 82 abutted against the top wall portion 44 remote from the left hand end wall 28. In addition, the abutment 76 is abutted by one end of the cover plate 66 and the free end of plate 66 abuts the block 50 and latches the latter in the operative position when the plate 66 is in the closed position, together with the top wall portion 44, closing the entire upper end of the sleeve 24 except for that portion thereof from which the support block 50 projects.

When the ball hitch member 62 is in the position thereof illustrated in FIG. 6, it is in the operative position thereof and may be readily used as a conventional truck bed mounted hitch.

Figure 7:
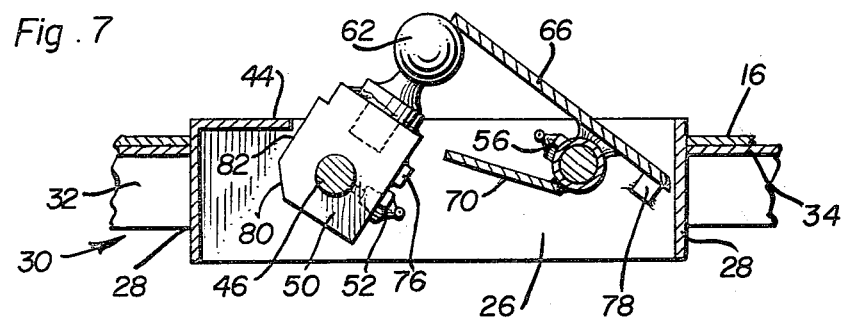
FIG. 7 is a sectional view similar to FIG. 6 but with the hitch member in a partially retracted position.
Figure 8:
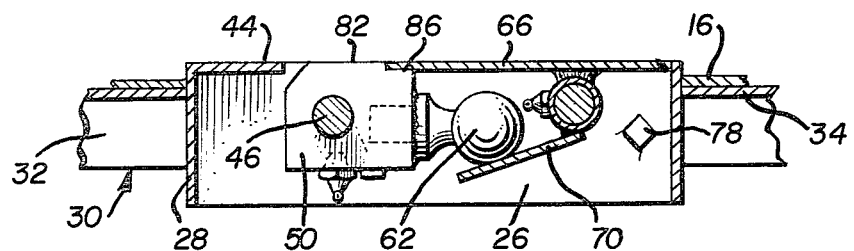
FIG. 8 is a sectional view similar to FIGS. 6 and 7, but with the hitch member in a fully retracted position.

When it is desired to shift the ball hitch member to the recessed position thereof illustrated in FIG. 8, the right hand end of the cover plate 66 as viewed in FIG. 6 is depressed downwardly into engagement with the abutment blocks 78 in the manner illustrated in FIG. 7 of the drawings. Then, the support block 50 is rotated in a clockwise direction with the ball hitch member 62 being snugly received beneath the left end of the cover plate 66 remote from the blocks 78. As the ball hitch member 62 swings pass the position thereof illustrated in FIG. 7 of the drawings toward the forward retracted position, the ball hitch member 62 engages the keeper plate 70 and thus automatically causes the cover plate 66 to swing from the open position thereof illustrated in FIG. 7 to the closed position thereof illustrated in FIG. 8. The eccentric weighting of the ball hitch member 62 in position thereof illustrated in FIG. 8 engaged with the keeper plate 70 maintains the cover plate 66 in the closed position thereof. The left end of the cover plate 66 is seated in a notch 86 formed in the abutment surface 82 and the latter is flush with the upper surface of the cover plate 66, the chamfer 80 providing sufficient clearance during swinging movement of the block 50 from the partially retracted position thereof of FIG. 7 to the fully retracted position thereof illustrated in FIG. 8.

When the ball hitch member 62 is fully retracted, the abutment surface 82, the top wall portion 44 and the cover plate 66 are flush and substantially fully close the upper end of the sleeve 24 to thus maintain a substantially uninterrupted load surface for the flooring 16.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination, a vehicle including opposite side longitudinal frame rail means, a load bed disposed over and anchored relative to said frame rail means, said load bed including a central opening therein between said frame rail means, an inverted channel member including depending opposite side longitudinal flanges and an upper web extending and connected between the upper marginal portions of said side flanges, said side flanges terminating spaced distances from the opposite terminal ends of said web and said web including an opening formed therethrough centrally intermediate the opposite ends thereof, said channel member extending between said frame rail means with said openings registered and the opposite terminal ends of said web anchored over said frame rail means between the latter and said load bed, an upstanding mounting sleeve secured through the opening formed in said web and extending up into the opening formed in said load bed, said opening in said web being spaced inwardly from said side flanges, the portions of said load bed surrounding the opening therein overlying and being supported from said web, said sleeve defining an upwardly opening recess, a hitch member pivotally mounted in said recess for oscillation between an operative position projecting upwardly from said recess and an inoperative position with a portion of said hitch member substantially flush with the upper end of said mounting sleeve and latch means operatively associated with said hitch member and mount for releasably retaining said hitch member in said operative position.

2. The combination of claim 1 wherein said portion of said hitch member and said latch means substantially fully close the upper end of said mounting sleeve substantially flush with said load bed when said hitch member is in said inoperative position.

3. The combination of claim 2 wherein said latch means includes structure substantially closing those open upper portions of said mounting sleeve other than the portion of said mounting sleeve from which said hitch member projects upwardly when the hitch member in said operating position.

4. The combination of claim 1 wherein said hitch member includes an abutment portion engageable with said mount to limit angular displacement of said hitch member to said operative position and said abutment portion is also engageable by said latch means to limit angular displacement of said hitch member to said inoperative position.

5. The combination of claim 4 wherein said latch comprises an oscillatably supported cover plate for the upper end of said mounting sleeve.

6. The combination of claim 1 wherein said mounting sleeve includes a stationary top wall portion closing one portion of the upper end of said recess, said hitch member including a side abutment portion thereof engageable with said stationary top wall portion upon swinging movement of said hitch member to said operative position.

7. The combination of claim 6 wherein said latch means comprises an oscillatable cover plate supported from said mounting sleeve and swingable from an inoperative position to an operative position as said hitch member is angularly displaced to is operative position, said cover plate including a free edge portion thereof abuttingly engageable with the side of said hitch member remote from said hitch member abutment portion when said hitch member and cover plate are in the operative positions thereof.

8. The combination of claim 7 wherein said stationary top wall portion, said abutment portion of said hitch member and said cover plate substantially completely close the upper end of said recess when said hitch member is in said inoperative portion and said cover plate is in said operative position.

9. The combination of claim 8 wherein said cover plate includes a portion thereof abuttingly engageable with said hitch member abutment portion upon swinging movement of the hitch member to its inoperative position and movement of said cover plate to said operative position to limit further swinging movement of said hitch member away from said operative position.

* * * * *